(12) United States Patent
Tamura (10) Patent No.: US 9,854,114 B2
(45) Date of Patent: Dec. 26, 2017

(54) DISPLAY DEVICE FOR DISPLAYING CHARACTER INFORMATION, INFORMATION PROCESSING APPARATUS INCLUDING DISPLAY DEVICE, AND CHARACTER INFORMATION DISPLAY METHOD

(71) Applicant: KYOCERA Document Solutions Inc., Osaka-shi, Osaka (JP)

(72) Inventor: Takashi Tamura, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 0 days.

(21) Appl. No.: 15/150,313

(22) Filed: May 9, 2016

(65) Prior Publication Data

US 2016/0337538 A1 Nov. 17, 2016

(30) Foreign Application Priority Data

May 11, 2015 (JP) ................................. 2015-096167

(51) Int. Cl.
*H04N 1/00* (2006.01)
(52) U.S. Cl.
CPC ..... *H04N 1/00795* (2013.01); *H04N 1/00411* (2013.01); *H04N 2201/0094* (2013.01)
(58) Field of Classification Search
CPC ........... H04N 1/00795; H04N 1/00411; H04N 2201/0094
See application file for complete search history.

(56) References Cited

U.S. PATENT DOCUMENTS 6,469,719 B1 * 10/2002 Kino ..................... G06F 3/0482
715/810

FOREIGN PATENT DOCUMENTS

JP 2006165785 A 6/2006

* cited by examiner

*Primary Examiner* — Kent Yip
(74) *Attorney, Agent, or Firm* — Alleman Hall Creasman & Tuttle LLP (57) ABSTRACT

A display device includes a display portion, a display processing portion, a detection processing portion, and a replacement processing portion. The display processing portion displays a plurality of pieces of character information as a list in a display area set in the display portion. The detection processing portion detects specific character information from among the plurality of pieces of character information displayed by the display processing portion, the specific character information being character information whose display size exceeds a size of the display area. The replacement processing portion, when the detection processing portion detects the specific character information, replaces each instance of a specific word among words included in the plurality of pieces of character information displayed by the display processing portion, with an abbreviation of the specific word, the specific word being a word included in the specific character information detected by the detection processing portion.

4 Claims, 9 Drawing Sheets

| | ID INFO | CHARACTER INFO | NO. OF CHARACTERS |
|---|---|---|---|
| D11 | a001 | 53% Folio >> Statement | 22 |
| D12 | a002 | 64% Letter >> Statement | 23 |
| D13 | a003 | 78% Legal >> Letter | 19 |
| D14 | a004 | 90% Folio >> A4 | 15 |
| D15 | a005 | 129% Statement >> Letter | 24 |

|  | WORD | ABBREVIATION |
|---|---|---|
| D21 | Folio | FOL |
| D22 | Statement | STMT |
| D23 | Letter | LTR |
| D24 | Legal | LGL |

```
                    ┌─────────────────────┐
                    │ Zoom Setting        │
         A11 ──────│ 53% Folio >> STMT   │
         A12 ──────│ 64% LTR >> STMT     │
         A13 ──────│ 78% Legal >> LTR    │
         A14 ──────│ 90% Folio >> A4     │
         A15 ──────│ 129% STMT >> LTR    │
                    └─────────────────────┘
```

| Zoom Setting |
| --- |
| 53% Folio >> STMT |
| 64% Letter >> STMT |
| 78% Legal >> LTR |
| 90% Folio >> A4 |
| 129% STMT >> LTR |

FIG.9

| | ID INFO | CHARACTER INFO | NO. OF CHARACTERS | REPLACEMENT CHARACTER INFO |
|---|---|---|---|---|
| D11 | a001 | 53% Folio >> Statement | 22 | 53% FOL >> STMT |
| D12 | a002 | 64% Letter >> Statement | 23 | 64% LTR >> STMT |
| D13 | a003 | 78% Legal >> Letter | 19 | 78% LGL >> LTR |
| D14 | a004 | 90% Folio >> A4 | 15 | 90% FOL >> A4 |
| D15 | a005 | 129% Statement >> Letter | 24 | 129% STMT >> LTR |

DISPLAY DEVICE FOR DISPLAYING CHARACTER INFORMATION, INFORMATION PROCESSING APPARATUS INCLUDING DISPLAY DEVICE, AND CHARACTER INFORMATION DISPLAY METHOD

INCORPORATION BY REFERENCE

This application is based upon and claims the benefit of priority from the corresponding Japanese Patent Application No. 2015-096167 filed on May 11, 2015, the entire contents of which are incorporated herein by reference.

BACKGROUND

The present disclosure relates to a display device for displaying character information, an information processing apparatus including a display device, and a character information display method.

An information processing apparatus such as a printer that performs image processing based on image data, includes a display portion such as a liquid crystal display. In this type of information processing apparatus, character information such as a message from the information processing apparatus to the user is displayed on the display portion. The character information is displayed in a display area that is set in the display portion. In addition, in this type of information processing apparatus, a plurality of pieces of character information are displayed as a list in the display area.

Meanwhile, there may be case where a display size of character information displayed in the display portion exceeds the size of the display area set in the display portion. Such a case may occur for the following reason, for example. That is, the display portion provided in the information processing apparatus may be different in size depending on the model of the information processing apparatus. When the display portion is different in size, the display area set in the display portion may be different in size. As a result, in a case where character information is used in common by a plurality of information processing apparatuses of different models, in an information processing apparatus of a model whose display portion is smaller in size than that of the information processing apparatuses of the other models, a display size of the character information displayed in the display portion may exceed the size of the display area. On the other hand, there is known an information processing apparatus that can replace a word included in the character information with an abbreviation of the word when a display size of the character information displayed on the display portion exceeds the size of the display area.

SUMMARY

A display device according to an aspect of the present disclosure includes a display portion, a display processing portion, a detection processing portion, and a replacement processing portion. The display processing portion displays a plurality of pieces of character information as a list in a display area set in the display portion. The detection processing portion detects specific character information from among the plurality of pieces of character information displayed by the display processing portion, the specific character information being character information whose display size exceeds a size of the display area. The replacement processing portion, when the detection processing portion detects the specific character information, replaces each instance of a specific word among words included in the plurality of pieces of character information displayed by the display processing portion, with an abbreviation of the specific word, the specific word being a word included in the specific character information detected by the detection processing portion.

An information processing apparatus according to another aspect of the present disclosure includes a display device. The display device includes a display portion, a display processing portion, a detection processing portion, and a replacement processing portion. The display processing portion displays a plurality of pieces of character information as a list in a display area set in the display portion. The detection processing portion detects specific character information from among the plurality of pieces of character information displayed by the display processing portion, the specific character information being character information whose display size exceeds a size of the display area. The replacement processing portion, when the detection processing portion detects the specific character information, replaces each instance of a specific word among words included in the plurality of pieces of character information displayed by the display processing portion, with an abbreviation of the specific word, the specific word being a word included in the specific character information detected by the detection processing portion.

A character information display method according to an aspect of the present disclosure is for execution in a display device including a display portion, and includes a first step, a second step, and a third step. The first step displays a plurality of pieces of character information as a list in a display area set in the display portion. The second step detects specific character information from among the plurality of pieces of character information displayed by the first step, the specific character information being character information whose display size exceeds a size of the display area. The third step, when the second step detects the specific character information, replaces each instance of a specific word among words included in the plurality of pieces of character information displayed by the first step, with an abbreviation of the specific word, the specific word being a word included in the specific character information detected by the second step.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following describes an embodiment of the present disclosure with reference to the attached drawings for the understanding of the present disclosure. It should be noted that the following embodiment is an example of a specific embodiment of the present disclosure and should not limit the technical scope of the present disclosure.

[Outlined Configuration of Image Processing Apparatus 10]

First, an outlined configuration of an image processing apparatus 10 according to an embodiment of the present disclosure is described with reference to FIG. 1 and FIG. 2. Here, FIG. 1 is a schematic cross-sectional view showing the configuration of the image processing apparatus 10.

The image processing apparatus 10 is a multifunction peripheral having a plurality of functions such as a scan function for reading image data from a document sheet, a print function for forming an image based on the image data, a facsimile function, and a copy function. Here, the image processing apparatus 10 is an example of the information processing apparatus of the present disclosure. It is noted that the present disclosure is applicable to information processing apparatuses such as a scanner device, a printer device, a facsimile device, a copier, a personal computer, a smartphone, a tablet terminal, a television, an air conditioner, a washing machine, a refrigerator, and a microwave.

Figure 1:
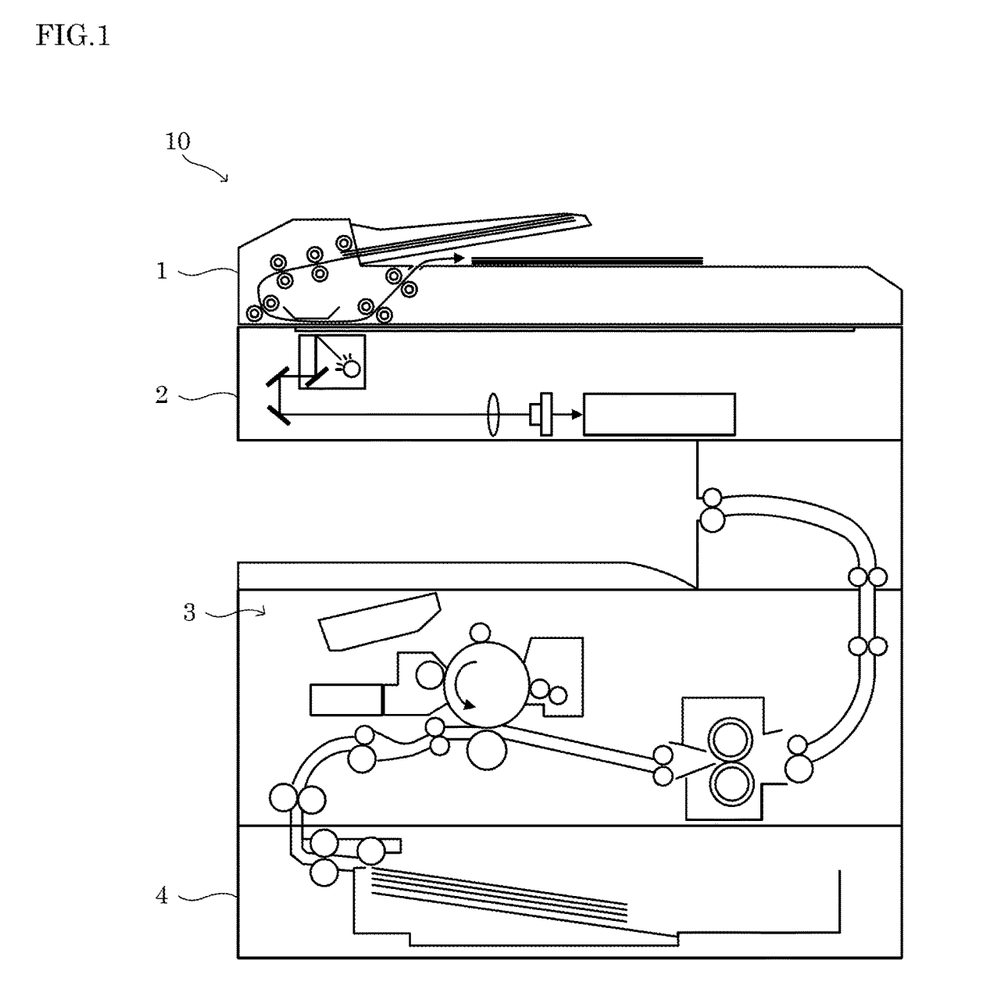
FIG. 1 is a diagram showing the configuration of an image processing apparatus according to an embodiment of the present disclosure.
Figure 2:
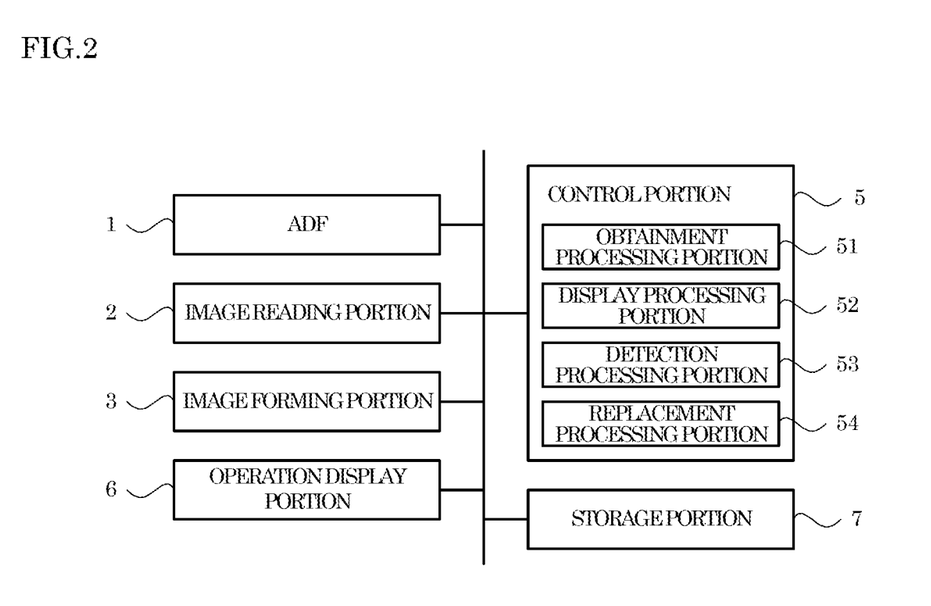
FIG. 2 is a block diagram showing the system configuration of the image processing apparatus according to an embodiment of the present disclosure.

Specifically, as shown in FIG. 1 and FIG. 2, the image processing apparatus 10 includes an ADF (Auto Document Feeder) 1, an image reading portion 2, an image forming portion 3, a sheet feed portion 4, a control portion 5, an operation/display portion 6, and a storage portion 7. Here, a device including the control portion 5 and the operation/display portion 6 is an example of the display device of the present disclosure.

The ADF 1 includes a document sheet setting portion, a plurality of conveyance rollers, a document sheet pressing, and a sheet discharge portion, and conveys a document sheet so that it is read by the image reading portion 2. The image reading portion 2 includes a document sheet table, a light source, a plurality of mirrors, an optical lens, and a CCD, and is configured to read image data from a document sheet.

The image forming portion 3 is configured to form an image by the electrophotography based on image data read by the image reading portion 2 or input from an external information processing apparatus. Specifically, the image forming portion 3 includes a photoconductor drum, a charging device, a laser scanning unit, a developing device, a transfer roller, a cleaning device, a fixing roller, a pressure roller, and a sheet discharge portion. In the image forming portion 3, an image is formed on a sheet supplied from the sheet feed portion 4, and the sheet with the image formed thereon is discharged by the sheet discharge portion.

The control portion 5 includes control equipment such as CPU, ROM, and RAM that are not shown. The CPU is a processor that executes various calculation processes. The ROM is a nonvolatile storage device in which various information such as control programs for causing the CPU to execute various processes are stored in advance. The RAM is a volatile storage medium, and is used as a temporary storage memory (working area) for the various processes executed by the CPU. In the control portion 5, the CPU executes the various control programs stored in advance in the ROM. This allows the image processing apparatus 10 to be controlled comprehensively by the control portion 5. It is noted that the control portion 5 may be formed as an electronic circuit such as an integrated circuit (ASIC), and may be a control portion provided independently of a main control portion that comprehensively controls the image processing apparatus 10.

The operation/display portion 6 includes a display portion and an operation portion. The display portion is, for example, a liquid crystal display and displays various types of information based on control instructions from the control portion 5. The operation portion is composed of, for example, operation keys or a touch panel through which various types of information are input to the control portion 5 based on user operations. Here, the operation/display portion 6 is an example of the display portion of the present disclosure.

The storage portion 7 is a nonvolatile storage device. The storage portion 7 is, for example, a storage device such as a flash memory, an SSD (Solid State Drive), or an HDD (Hard Disk Drive).

Meanwhile, in the image processing apparatus 10, character information such as a message from the image processing apparatus 10 to the user is displayed on the operation/display portion 6. The character information is displayed in a display area that is set in the operation/display portion 6. In addition, in the image processing apparatus 10, a plurality of pieces of character information are displayed as a list in the display area.

Here, there may be case where a display size of character information displayed in the operation/display portion 6 exceeds the size of the display area set in the operation/display portion 6. Such a case may occur for the following reason, for example. That is, the operation/display portion 6 provided in the image processing apparatus 10 may be different in size depending on the model of the image processing apparatus 10. When the operation/display portion 6 is different in size, the display area set in the operation/display portion 6 may be different in size. As a result, in a case where the character information is used in common in a plurality of image processing apparatuses 10 of different models, a display size of character information displayed in the operation/display portion 6 may exceed the size of the display area set in an image processing apparatus 10 of a model whose operation/display portion 6 is smaller in size than the operation/display portions 6 of image processing apparatuses 10 of other models. On the other hand, there is known an information processing apparatus that can replace a word included in character information with an abbreviation of the word when a display size of the character information to be displayed in the operation/display portion 6 exceeds the size of the display area.

Meanwhile, there may be case where a plurality of pieces of character information displayed as a list on the operation/display portion 6 include a piece of character information whose display size exceeds the size of the display area set in the operation/display portion 6. When such a piece of character information is detected, a word included in the piece of character information may be replaced with an abbreviation of the word. In that case, however, the word may be included in any other one of the displayed plurality of pieces of character information. This means that two types of words of the same meaning are included in the displayed plurality of pieces of character information. In that case, while confirming the content of the displayed plurality of pieces of character information, the user may consider that the word and the abbreviation have different meanings. On the other hand, in the image processing apparatus 10 according to an embodiment of the present disclosure, as described in the following, it is possible to restrict generation of misunderstanding in the user confirming the content of the plurality of pieces of character information displayed as a list on the operation/display portion 6.

Specifically, a character information display program for causing the CPU to execute a character information display process that is described below (see the flowchart of FIG. 6) is stored in the ROM of the control portion 5 in advance. It is noted that the character information display program may be recorded on a computer-readable recording medium such as a CD, a DVD, or a flash memory, and may be installed from the recording medium to the storage portion 7.

As shown in FIG. 2, the control portion 5 includes an obtainment processing portion 51, a display processing portion 52, a detection processing portion 53, and a replacement processing portion 54. Specifically, the control portion 5 executes the character information display program stored in the ROM by using the CPU. This allows the control portion 5 to function as the obtainment processing portion 51, the display processing portion 52, the detection processing portion 53, and the replacement processing portion 54.

The obtainment processing portion 51 obtains a plurality of pieces of character information that are to be displayed as a list on the operation/display portion 6. Specifically, when a predetermined obtainment condition is satisfied, the obtainment processing portion 51 obtains a plurality of pieces of character information that correspond to the obtainment condition. The obtainment condition includes, for example, an input of an operation on the operation/display portion 6 to instruct a display of a list of a plurality of pieces of character information that belong to a predetermined item. It is noted that the obtainment condition may include a start or an end of a plurality of predetermined processes in the image processing apparatus 10, and an occurrence of a plurality of errors in the image processing apparatus 10.

By way of example, in the image processing apparatus 10, a plurality of pieces of character data including the character information are stored in the storage portion 7 in advance. It is noted that the character data may be stored in the ROM of the control portion 5 or a storage device provided in an external server or the like.

Figure 3:
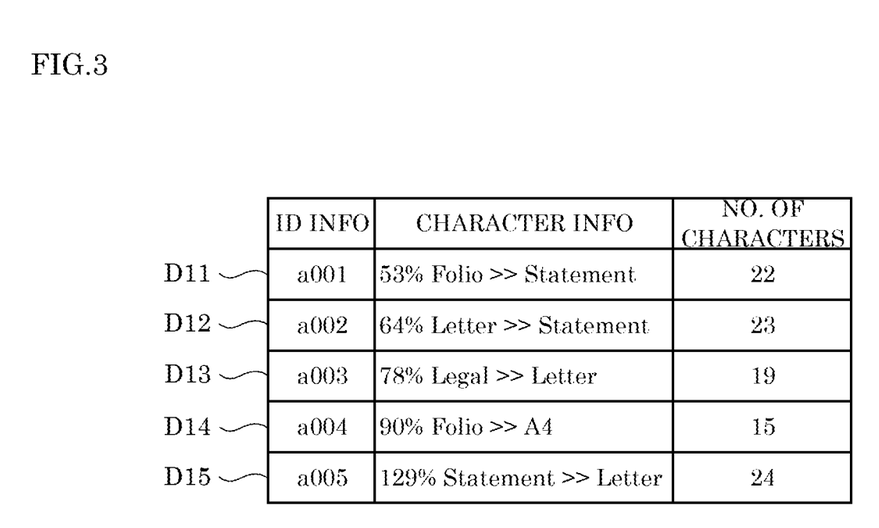
FIG. 3 is a diagram showing an example of character data stored in a storage portion of the image processing apparatus according to an embodiment of the present disclosure.

Here, FIG. 3 shows an example of the character data stored in the storage portion 7. Character data D11 to D15 shown in FIG. 3 each include identification information, character information, and information indicating the number of characters included in the character information. It is noted that the character information included in the character data D11 to D15 shown in FIG. 3 is a text that indicates relationship between a paper sheet size and a magnification/reduction rate.

In the image processing apparatus 10, the obtainment condition is associated with a plurality of pieces of identification information in advance. When the obtainment condition is satisfied, the obtainment processing portion 51 obtains a plurality of pieces of character data from the storage portion 7 based on the plurality of pieces of identification information associated with the obtainment condition.

The display processing portion 52 displays the plurality of pieces of character data obtained by the obtainment processing portion 51 as a list in the display area set in the operation/display portion 6. For example, when the obtainment condition is satisfied, the display processing portion 52 sets the display area of a predetermined size on an operation screen displayed on the operation/display portion 6. It is noted that when the obtainment condition is satisfied, the display processing portion 52 may display, on the operation/display portion 6, a display screen including the display area of a predetermined size.

Figure 4:
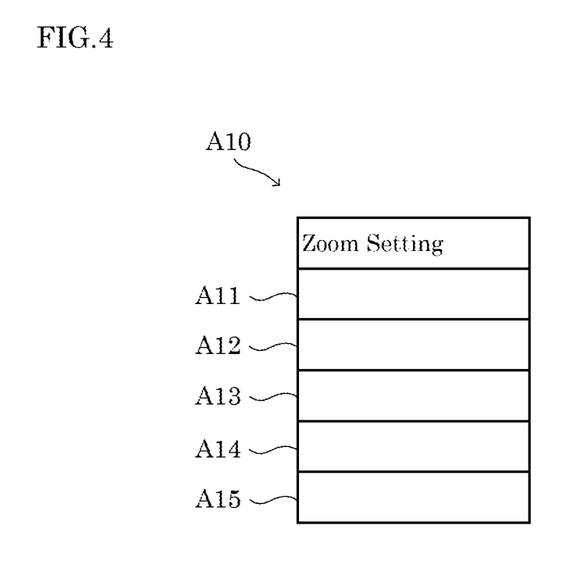
FIG. 4 is a diagram showing an example of a display area set in an operation/display portion of the image processing apparatus according to an embodiment of the present disclosure.

FIG. 4 shows an example of the display area set in the operation/display portion 6. A display area A10 shown in FIG. 4 includes a plurality of divided areas A11 to A15. In the divided areas A11 to A15, the character information obtained by the obtainment processing portion 51 is displayed. It is noted that in a space above the divided area A11 in the display area A10, the name of an item to which the plurality of pieces of character information displayed in the divided areas A11 to A15 belong, is displayed.

The display processing portion 52 displays, in the display area, the character information on which the process of the replacement processing portion 54 has been performed. The replacement processing portion 54 is described below.

The detection processing portion 53 detects specific character information from among the plurality of pieces of character information displayed by the display processing portion 52, wherein the specific character information is character information whose display size exceeds the size of the display area. By way of example, the detection processing portion 53 calculates the number of displayable characters, namely, the number of characters that can be displayed in the display area set in the operation/display portion 6 by the display processing portion 52, based on a font size that has been set by the initial setting or a user operation. Subsequently, the detection processing portion 53 determines whether or not the number of characters of the character information included in the character data exceeds the number of displayable characters of the display area, based on the calculated number of displayable characters of the display area and the information indicating the number of characters included in the character information that was obtained by the obtainment processing portion 51. Upon determining that the number of characters of the character information exceeds the number of displayable characters of the display area, the detection processing portion 53 detects the character information as the specific character information.

Hereinafter, a word included in the specific character information detected by the detection processing portion 53 is referred to as a specific word. After the detection processing portion 53 detects the specific character information, the replacement processing portion 54 replaces each instance of a specific word among words included in the plurality of pieces of character information displayed by the display processing portion 52, with the abbreviation of the specific word. By way of example, the replacement processing portion 54 replaces as many specific words as corresponding to an excessive amount of the display size of the specific character information with respect to the size of the display area, with abbreviations of the specific words.

By way of example, in the image processing apparatus 10, the storage portion 7 stores abbreviation data which includes one or more words and one or more abbreviations that respectively correspond to the one or more words. It is noted that the abbreviation data may be stored in the ROM of the control portion 5, or may be stored in a storage device included in an external server or the like.

Figure 5:
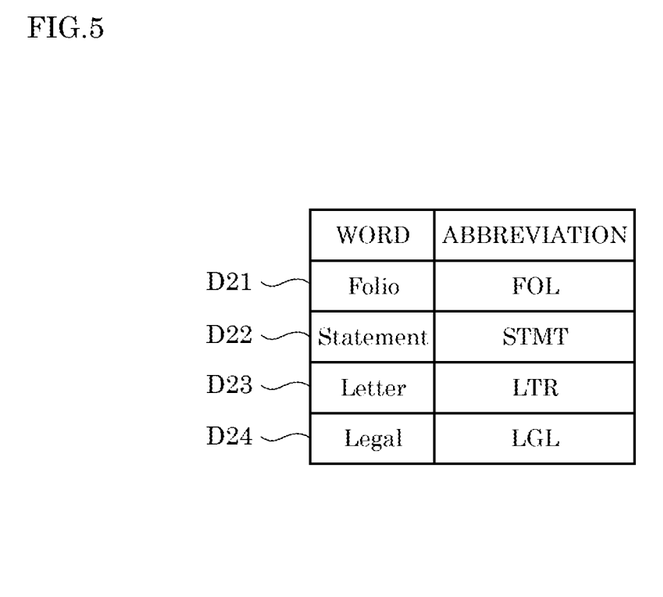
FIG. 5 is a diagram showing an example of abbreviation data stored in the storage portion of the image processing apparatus according to an embodiment of the present disclosure.

FIG. 5 shows an example of the abbreviation data stored in the storage portion 7. Abbreviation data D21 to D24 shown in FIG. 5 each include information indicating words, and information indicating abbreviations of the words.

After a piece of specific character information is detected, the replacement processing portion 54 extracts a word of the largest number of characters from among words included in the detected specific character information, and obtains a piece of abbreviation data that includes the extracted word (specific word), from the storage portion 7. Subsequently, the replacement processing portion 54 replaces each specific word among the words included in the plurality of pieces of character information obtained by the obtainment processing portion 51, with an abbreviation included in the obtained piece of abbreviation data.

After the replacement of the specific word with the abbreviation, if the display size of the specific character information exceeds the size of the display area, the replacement processing portion 54 extracts a word of the next largest number of characters from among the words included in the detected specific character information, and obtains a piece of abbreviation data that includes the extracted word (specific word), from the storage portion 7. Subsequently, the replacement processing portion 54 replaces each specific word among the words included in the plurality of pieces of character information obtained by the obtainment processing portion 51, with an abbreviation included in the obtained piece of abbreviation data.

Thereafter, the replacement processing portion 54 repeatedly executes the above-described process on the words included in the specific character information until the display size of the specific character information becomes equal to or smaller than the size of the display area. It is noted that the replacement processing portion 54 may execute the above-described process in an order that is different from the above-described order, on a plurality of words included in the specific character information.

Figure 9:
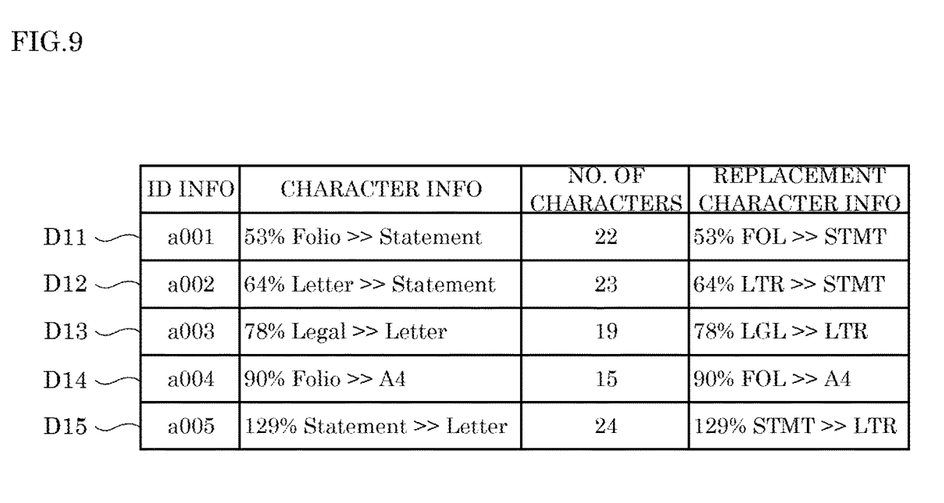
FIG. 9 is a diagram showing an example of character data stored in the storage portion of the image processing apparatus according to an embodiment of the present disclosure.

Meanwhile, in the image processing apparatus 10, the storage portion 7 may store, in advance, a plurality of pieces of replacement character information which respectively correspond to the plurality of pieces of character information, wherein in each of the plurality of pieces of replacement character information, one or more words included in the corresponding piece of character information have been replaced with abbreviations of the words. For example, the character data D11 to D15 stored in the storage portion 7 may each include the replacement character information as well as the identification information, the character information, and the information indicating the number of characters included in the character information, as shown in FIG. 9.

In the above-described case, after the detection processing portion 53 detects specific character information, the replacement processing portion 54 replaces a plurality of pieces of character information displayed by the display processing portion 52 with corresponding pieces of replacement character information.

[Character Information Display Process]

Figure 6:
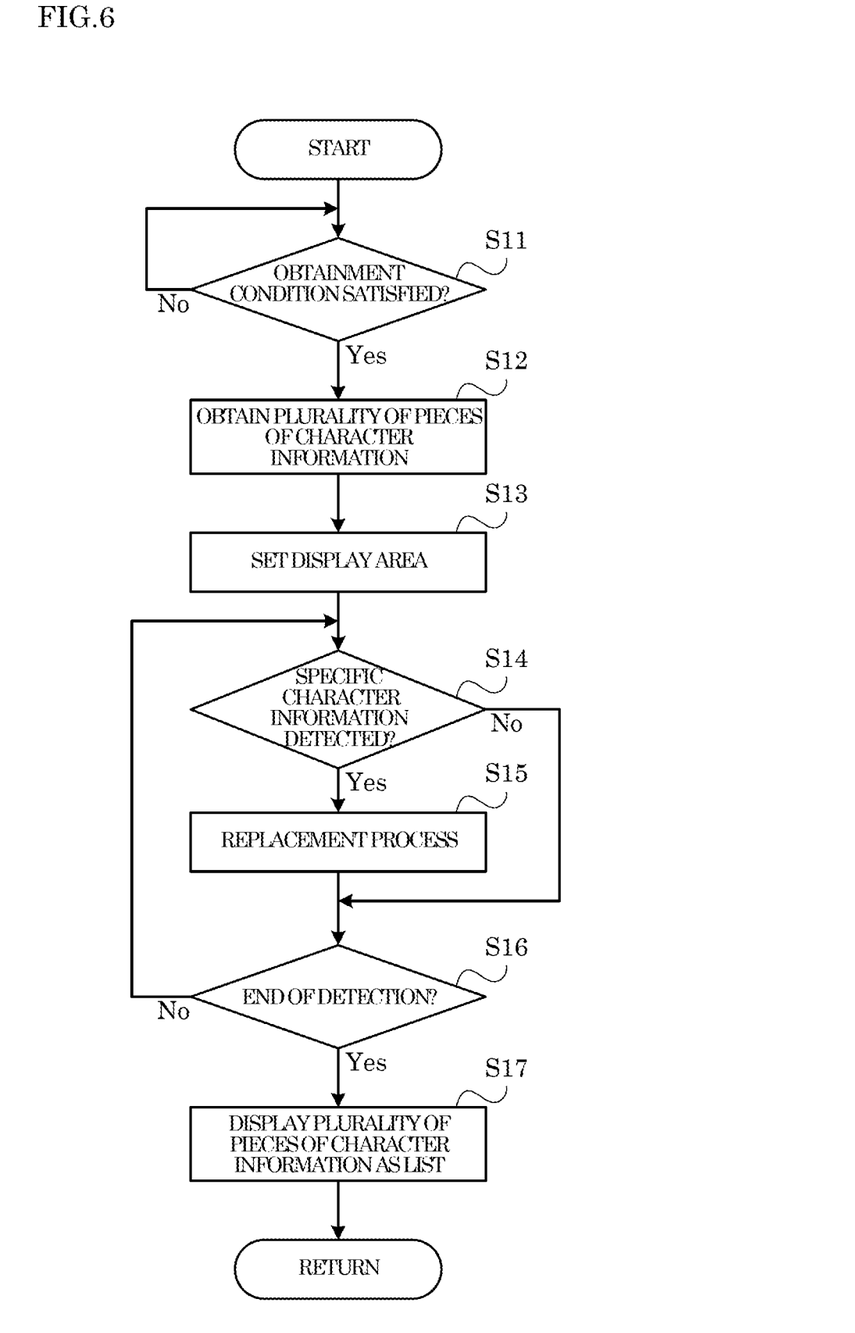
FIG. 6 is a flowchart showing an example of a character information display process executed by the image processing apparatus according to an embodiment of the present disclosure.

In the following, with reference to FIG. 6, a description is given of an example of the procedure of the character information display process executed by the control portion 5 in the image processing apparatus 10, and the character information display method of the present disclosure. Here, steps S11, S12, . . . represent numbers assigned to the processing procedures (steps) executed by the control portion 5.

<Step S11>

First, in step S11, the control portion 5 determines whether or not the obtainment condition is satisfied. For example, the control portion 5 determines that the obtainment condition is satisfied if an operation has been input to the operation/display portion 6 to instruct a display of a list of relationship between paper sheet sizes and magnification/reduction rates.

Upon determining that the obtainment condition is satisfied (Yes side at S11), the control portion 5 moves the process to step S12. In addition, upon determining that the obtainment condition is not satisfied (No side at S11), the control portion 5 causes the process to wait at step S11 until it determines that the obtainment condition is satisfied.

<Step S12>

In step S12, the control portion 5 obtains a plurality of pieces of character information that correspond to the obtainment condition that was judged to be satisfied in step S11. By way of example, the control portion 5 obtains character data D11 to D15 shown in FIG. 3 from the storage portion 7, based on a plurality of pieces of identification information associated with the obtainment condition. Here, the processes of step S11 and step S12 are executed by the obtainment processing portion 51 of the control portion 5.

<Step S13>

In step S13, the control portion 5 sets a display area of a predetermined size in the operation screen displayed on the operation/display portion 6. For example, the control portion 5 displays the display area A10 shown in FIG. 4 on the operation/display portion 6. Here, the process of step S13 is executed by the display processing portion 52 of the control portion 5.

<Step S14>

In step S14, the control portion 5 determines whether or not a piece of character information, among the plurality of pieces of character information obtained in step S12, is specific character information. For example, the control portion 5 determines whether or not a piece of character information among the character data D12 obtained in step S12, is specific character information.

By way of example, the control portion 5 calculates the number of displayable characters of the display area A10 set in step S13, based on a font size that has been set by the initial setting or a user operation. Subsequently, the control portion 5 determines whether or not the number of characters of the character information included in the character data D12 obtained in step S12 exceeds the number of displayable characters of the display area A10, based on the calculated number of displayable characters of the display area A10 and the information indicating the number of characters of the character information included in the character data D12 obtained in step S12. Upon determining that the number of characters of the character information included in the character data D12 exceeds the number of displayable characters of the display area A10, the control portion 5 determines that the character information included in the character data D12 is specific character information. For example, when the calculated number of displayable characters of the display area A10 is 18, the control portion 5 determines that the character information included in the character data D12 is specific character information.

Here, upon determining that the piece of character information, among the plurality of pieces of character information obtained in step S12, is specific character information (Yes side at S14), the control portion 5 moves the process to step S15. In addition, upon determining that the piece of character information is not specific character information (No side at S14), the control portion 5 moves the process to step S16.

<Step S15>

In step S15, the control portion 5 replaces each instance of the specific word among words included in the plurality of pieces of character information obtained in step S12, with the abbreviation of the specific word, wherein the specific word is a word included in the piece of character information that was determined as specific character information in step S14. Here, the process of step S15 is an example of the third step of the present disclosure, and is executed by the replacement processing portion 54 of the control portion 5.

By way of example, upon determining in step S14 that the piece of character information included in the character data D12 is specific character information, the control portion 5 extracts, from the piece of character information, a word "statement" that contains the largest number of characters in the words included in the piece of character information, and obtains abbreviation data D22 that includes the extracted word "statement" from the storage portion 7. Subsequently, the control portion 5 replaces each instance of the word (specific word) "statement" among words in a plurality of pieces of character information included in the character data D11 to D15 obtained in step S12, with abbreviation "STMT" that is included in the obtained abbreviation data D22.

In addition, after the replacement of the word "statement" with the abbreviation "STMT", if the display size of the character information included in the character data D12 exceeds the size of the display area A10, the control portion 5 extracts a word "letter" having the next largest number of characters from the character information included in the character data D12, and obtains abbreviation data D23 that includes the extracted word "letter" from the storage portion 7. Subsequently, the control portion 5 replaces each instance of the word (specific word) "letter" among words in a plurality of pieces of character information included in the character data D11 to D15 obtained in step S12, with abbreviation "LTR" included in the obtained abbreviation data D23.

It is noted that when the character data D11 to D15 stored in the storage portion 7 each include the replacement character information as shown in FIG. 9, the control portion 5, in step S15, may replace the plurality of pieces of character information obtained in step S12 with the corresponding pieces of replacement character information. In that case, the control portion 5 executes the process of step S17 after the process of step S15. This simplifies the processes of steps S14 to S16.

<Step S16>

In step S16, the control portion 5 determines whether or not the determination in step S14 of whether or not character information is specific character information has been made for each of the plurality of pieces of character information obtained in step S12.

Here, upon determining that the determination in step S14 of whether or not character information is specific character information has been made for each of the plurality of pieces of character information obtained in step S12 (Yes side at S16), the control portion 5 moves the process to step S17. In addition, upon determining that the determination in step S14 of whether or not character information is specific character information has not been made for each of the plurality of pieces of character information obtained in step S12 (No side at S16), the control portion 5 moves the process to step S14. In step S14 executed again, the control portion 5 makes the determination of whether or not character information is specific character information, on a piece of character information on which the determination has not been made. Here, the processes of step S14 and step S16 are an example of the second step of the present disclosure, and are executed by the detection processing portion 53 of the control portion 5.

<Step S17>

In step S17, the control portion 5 displays the plurality of pieces of character information which were obtained in step S12 and on which the process of step S15 was executed, as a list in the display area set in step S13. Here, the process of step S17 is an example of the first step of the present disclosure, and is executed by the display processing portion 52 of the control portion 5.

The control portion 5 displays the plurality of pieces of character information included in the character data D11 to D15 in the divided areas A11 to A15 of the display area A10 in a font size that has been set by the initial setting or a user operation.

Figure 7:
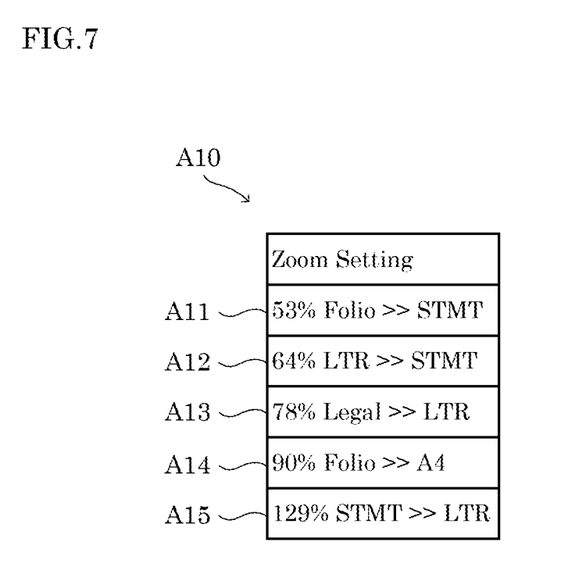
FIG. 7 is a diagram showing an example of a plurality of pieces of character information displayed on the operation/display portion of the image processing apparatus according to an embodiment of the present disclosure.

Here, FIG. 7 shows an example of the plurality of pieces of character information displayed as a list in the display area A10 in step S17. It is noted that FIG. 7 shows a display example for a case where in step S14, the number of displayable characters of the display area A10 is calculated as 18. As a result, specific words ("statement" and "letter") included in each piece of character information of the character data D11, D12, D13 and D15 that includes more than 18 characters, among a plurality of pieces of character information of the character data D11 to D15, have been replaced with abbreviations ("STMT" and "LTR") of the specific words.

Figure 8:
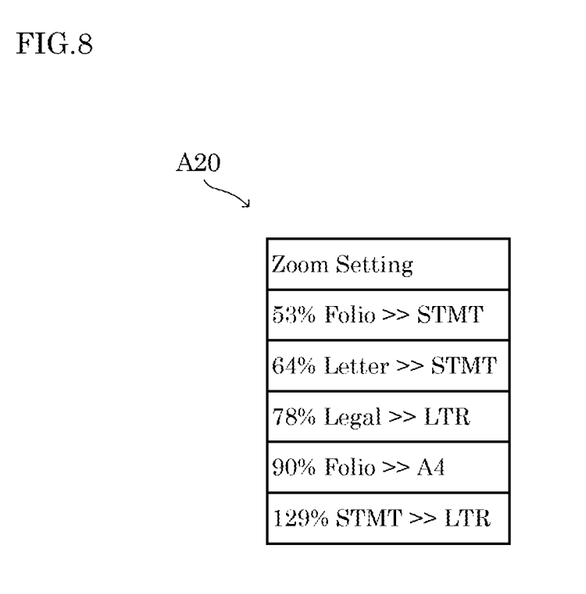
FIG. 8 is a diagram showing an example of a plurality of pieces of character information displayed on a display portion of a conventional information processing apparatus.

On the other hand, FIG. 8 shows a display example of the plurality of pieces of character information displayed as a list in a display area A20 set in a display portion of a conventional information processing apparatus. According to the conventional information processing apparatus, if, among a plurality of pieces of character information displayed as a list, there is a piece of specific character information whose display size exceeds the size of the display area A20, only one or more words included in the specific character information are replaced with abbreviations. As a result, in the conventional information processing apparatus, as shown in FIG. 8, both of the word "letter" and the abbreviation "LTR" that have the same meaning may be included in the plurality of pieces of character information displayed as a list.

On the other hand, in the image processing apparatus 10, each instance of the one or more words included in the plurality of pieces of character information displayed as a list is replaced with an abbreviation thereof. Thus, as shown in FIG. 7, it does not happen that both of the word "letter"

and the abbreviation "LTR" that have the same meaning are included in the plurality of pieces of character information displayed as a list.

As described above, in the character information display process, when a piece of specific character information is detected, each instance of the specific word (a word included in the detected piece of specific character information) among words included in the plurality of pieces of character information displayed as a list in the display area is replaced with an abbreviation of the specific word. This prevents a word and an abbreviation that have the same meaning from being included in the plurality of pieces of character information displayed as a list. It is thus possible to restrict generation of misunderstanding in the user confirming the content of the plurality of pieces of character information displayed as a list on the operation/display portion 6.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A display device comprising:
a display portion;
a nonvolatile storage storing a plurality of pieces of character information and a plurality of pieces of replacement character information which respectively correspond to the plurality of pieces of character information, each of the plurality of pieces of character information including a plurality of words indicating a paper sheet size and a numeral indicating a magnification, each of the plurality of pieces of replacement character information including a plurality of abbreviations of the plurality of words included in a corresponding one of the plurality of pieces of character information, and the numeral included in the corresponding one of the plurality of pieces of character information;
a processor;
a display processing portion executed by a calculation process of the processor and configured to display a plurality of pieces of character information as a list in a display area set in the display portion;
a detection processing portion executed by the calculation process of the processor and configured to detect specific character information from among the plurality of pieces of character information displayed by the display processing portion, the specific character information being character information whose display size exceeds a size of the display area; and
a replacement processing portion executed by the calculation process of the processor and configured to, when the detection processing portion detects the specific character information, replace the plurality of pieces of character information displayed by the display processing portion with the plurality of pieces of replacement character information which respectively correspond to the plurality of pieces of character information.

2. An information processing apparatus comprising:
the display device according to claim 1.

3. The information processing apparatus according to claim 2 comprising either or both of an image reading portion and an image forming portion, the image reading portion being configured to read image data from a document sheet, the image forming portion being configured to form an image based on image data.

4. A character information display method for execution in a display device including a display portion; a nonvolatile storage storing a plurality of pieces of character information and a plurality of pieces of replacement character information which respectively correspond to the plurality of pieces of character information, each of the plurality of pieces of character information including a plurality of words indicating a paper sheet size and a numeral indicating a magnification, each of the plurality of pieces of replacement character information including a plurality of abbreviations of the plurality of words included in a corresponding one of the plurality of pieces of character information, and the numeral included in the corresponding one of the plurality of pieces of character information; and a processor, the character information display method comprising:
a first step, executed on the processor, of displaying a plurality of pieces of character information as a list in a display area set in the display portion;
a second step, executed on the processor, of detecting specific character information from among the plurality of pieces of character information displayed by the first step, the specific character information being character information whose display size exceeds a size of the display area; and
a third step, executed on the processor, of, when the specific character information is detected in the second step, replacing the plurality of pieces of character information displayed by the first step with the plurality of pieces of replacement character information which respectively correspond to the plurality of pieces of character information.

* * * * *